US012693299B2

(12) United States Patent
Blandford et al.

(10) Patent No.: US 12,693,299 B2
(45) Date of Patent: Jul. 28, 2026

(54) NON-DESTRUCTIVE TESTING SYSTEM WITH INTERCHANGEABLE INSPECTION CARDS

(71) Applicant: Verifi Technologies, LLC, Waco, TX (US)

(72) Inventors: Benjamin M. Blandford, Waco, TX (US); Nathaniel J. Blackman, Hewitt, TX (US); Gary Georgeson, Tacoma, WA (US)

(73) Assignee: Verifi Technologies, LLC, Waco, TX (US)

( * ) Notice: Subject to any disclaimer, the term of this patent is extended or adjusted under 35 U.S.C. 154(b) by 220 days.

(21) Appl. No.: 18/587,284

(22) Filed: Feb. 26, 2024

(65) Prior Publication Data

US 2024/0288455 A1    Aug. 29, 2024

Related U.S. Application Data

(60) Provisional application No. 63/448,504, filed on Feb. 27, 2023.

(51) Int. Cl.
*G01N 35/00* (2006.01)
*G01N 27/90* (2021.01)

(52) U.S. Cl.
CPC ....... *G01N 35/00584* (2013.01); *G01N 27/90* (2013.01); *G01N 35/0099* (2013.01)

(58) Field of Classification Search
None
See application file for complete search history.

(56) References Cited

U.S. PATENT DOCUMENTS

| | | | |
|---|---|---|---|
| 5,729,660 A | 3/1998 | Chiabrera et al. | |
| 6,161,435 A | 12/2000 | Bond et al. | |
| 6,191,943 B1 * | 2/2001 | Tracy | G06F 1/203 |
| | | | 361/679.55 |
| 8,202,219 B2 | 6/2012 | Luo et al. | |
| 8,217,646 B2 * | 7/2012 | Karpen | G01N 27/904 |
| | | | 324/228 |
| 8,689,434 B2 * | 4/2014 | Yang | H05K 3/0005 |
| | | | 29/709 |
| 9,092,712 B2 * | 7/2015 | Kroener | H05K 1/0266 |
| 9,354,670 B2 * | 5/2016 | DeRosa | G06F 1/1615 |
| 9,638,553 B2 * | 5/2017 | Coombs | G01N 29/226 |
| 9,858,748 B2 * | 1/2018 | Thompson | A63F 13/25 |
| 10,823,703 B2 * | 11/2020 | Kollgaard | G01N 29/0645 |
| 10,920,574 B1 | 2/2021 | Yang et al. | |
| 2006/0253025 A1 * | 11/2006 | Kaufman | A61B 8/0875 |
| | | | 600/437 |

* cited by examiner

*Primary Examiner* — Richard Isla
(74) *Attorney, Agent, or Firm* — Neo IP

(57) ABSTRACT

The present invention is directed to a non-destructive testing system including a tablet without modular, interchangeable inspection cards for performing inspections with different end effectors and/or performing different types of inspections with the same end effectors. The modular, interchangeable inspection cards are easily removable and attached to a external rear face of the tablet, or inserted into a port extending into the tablet.

5 Claims, 5 Drawing Sheets

NON-DESTRUCTIVE TESTING SYSTEM WITH INTERCHANGEABLE INSPECTION CARDS

CROSS-REFERENCE TO RELATED APPLICATIONS

This application is related to and claims priority from the following US patents and patent applications: this application claims priority from and the benefit of U.S. Provisional Patent Application No. 63/448,504, filed Feb. 27, 2023, which is incorporated herein by reference in its entirety.

BACKGROUND OF THE INVENTION

1. Field of the Invention

The present invention relates to system and methods for nondestructive testing, and more specifically to scanning devices with interchangeable inspection cards.

2. Description of the Prior Art

It is generally known in the prior art to provide non-destructive testing instruments, such as flaw detectors, having a single, built-in function generator component for generating a scanning signal.

Prior art patent documents include the following:

U.S. Pat. No. 10,920,574 for Acoustic testing of core samples by inventors Yang et al., filed Oct. 20, 2020 and issued Feb. 16, 2021, discloses a central member defining a sample chamber and including an elastic material configured to enclose at least a portion of a sample, acoustic sensors configured to detect sound waves in the sample chamber, and acoustic emitters configured to emit sounds waves in the central member. A pressure-retaining case is configured to contain a pressurized fluid between an annulus formed between the pressure-retaining case and the central member. A switch is configured to connect or disconnect a pulser and receiver circuit to a specified emitter of the acoustic emitters. A data acquisition unit is configured to receive a signal from each of the acoustic sensors. A pulser and receiver circuit is configured to send an electric pulse to an acoustic emitter and a control signal to the data acquisition unit.

U.S. Pat. No. 8,202,219 for Ultrasonic bone assessment apparatus and method by inventors Luo et al., filed Feb. 22, 2005 and issued Jun. 19, 2012, discloses a method for the assessment of various properties of bone. The method includes applying a pair of ultrasound transducers to skin on opposite sides of the bone and generating an ultrasound signal and directing the signal through both the bone to obtain a bone output signal. The method further includes establishing a set of parameters associated with the bone output signal and then further processing the parameters in order to obtain the desired bone property. Two novel parameters are also disclosed, namely the net time delay (NTD) and mean time duration (MTD) parameters. An apparatus for the assessment of various properties of bone is also provided. The apparatus includes a pair of ultrasound transducers which may be single-element transducers or array transducers in any combination. The apparatus further includes various computer hardware components and computer software for generating and directing the ultrasound signal, establishing the parameter set and performing the processing. In addition, an apparatus that is battery powered, handheld, and portable and operates in real time is also provided.

U.S. Pat. No. 6,161,435 for Method and apparatus for determining the state of fouling/cleaning of membrane modules by inventors Bond et al., filed Jul. 21, 1999 and issued Dec. 19, 2000, discloses the fouling state of a polymeric membrane within the high-pressure housing of a spiral wound or a hollow fiber membrane module being determined. An ultrasonic transducer positioned with its emitting face in physical engagement with the outer surface of the housing is pulse energized by a pulser/receiver device. A membrane echo signal is detected by a receiver of the pulser/receiver device. A reference echo signal indicative of a fouled or an unfouled state of the membrane is compared to the echo signal to determine the membrane fouling state. The echo to reference comparing step can be based upon comparing amplitude domain signals, comparing time-domain signals, comparing combinations of amplitude domain and time-domain signals, and comparing transformations of amplitude domain and time-domain signals. A clean or a fouled reference echo can be provided from a clean or a fouled membrane and then stored for use during a liquid separation process, or a clean reference echo signal can be obtained on-line from a second transducer whose echo signal is derived from an area of the membrane known to remain relatively unfouled during the liquid separation process, or a clean or fouled reference echo signal can be provided for later use during a cleaning process or during a liquid separation process. Multiple transducers and a switching network can sample the fouling state at different positions within the membrane module.

U.S. Pat. No. 5,729,660 for 3-D inverse scattering by artificial intelligence: apparatus and metho by inventors Chiabrera et al., filed Oct. 16, 1996 and issued Mar. 17, 1998, discloses an unknown object being non-destructively and quantitatively evaluated for three-dimensional spatial distribution of a set of material constitutive parameters of the unknown object, using a multi-element array-source transducer and a multi-element array-detector transducer located near the unknown object. The array-source transducer exposes the array-detector transducer to a set of source-field patterns pursuant to a set of electrical input signals. An unknown object located near these transducers will be the cause of scattering, thus presenting a scattered-field pattern to the array detector transducer, for each pattern of the set of source-field patterns. In a related computation, a set of training signals is determined by evaluating on a computer the scattered field from a set of computer simulated training objects. A computer, a signal processor and a neural network operate from detector response to the computer simulated and unknown object scattered-field patterns, in each of two modes. In an initial mode, the neural network is "trained" or configured to process a set of transfer functions involved in array-detector response to scattered-field patterns evaluated by computer simulations for the known computer simulated objects; in another mode, the neural network utilizes its "trained" configuration in application to a set of transfer functions involved in array-detector response to scattered-field patterns produced by an unknown object, to generate estimates of the three-dimensional spatial distribution of the material constitutive parameters of the unknown object. In another embodiment, a set of the Biot poro-elastic material parameters of an unknown object is estimated.

SUMMARY OF THE INVENTION

The present invention relates to system and methods for nondestructive testing, and more specifically to scanning devices with interchangeable inspection cards.

It is an object of this invention to provide an easily interchangeable function generator system for non-destructive testing for use with multiple different end effectors, as well as with different handheld, mobile, and/or stationary inspection systems.

In one embodiment, the present invention is directed to a system for non-destructive testing of materials, including a tablet including a front display, connected with at least one end effector for conducting a nondestructive scan of a test object, one or more modular function generator cards, wherein the tablet includes a first plurality of prongs extending from and/or a first plurality of recesses defined in a rear face of the tablet, wherein the one or more modular function generator cards include a second plurality of prongs extending from and/or a second plurality of recesses defined in front faces of the one or more modular function generator cards, wherein the first plurality of prongs are configured to matingly engage with the second plurality of recesses and wherein the second plurality of prongs are configured to matingly engage with the first plurality of recesses, and wherein the one or more modular function generator cards include one or more pulser receiver elements and/or one or more eddy current signal generators.

In another embodiment, the present invention is directed to a method for non-destructive testing of materials, including a tablet, including a front display, receiving one or more commands to conduct a scan on a test object via network communication with at least one user device, wherein the one or more commands include requirements to use a plurality of different end effectors connected to the tablet, and/or a plurality of modalities for a single end effector connected to the tablet, at least one end effector connected to the tablet beginning a scan of the test object in accordance with the one or more commands, a first function generator card connected with the tablet driving the at least one end effector to conduct the scan, removing the first function generator card from the tablet and connecting a second function generator card to the tablet, wherein the second function generator card connects to the tablet via a first plurality of prongs and recesses on the tablet matingly connecting to a second plurality of prongs and recesses on the second function generator card, and the at least one end effector continuing the scan of the test object, driven by the second function generator card, wherein the first function generator card and/or the second function generator card include one or more pulser receivers and/or one or more eddy current signal generators.

In yet another embodiment, the present invention is directed to a system for non-destructive testing of materials, including a tablet including a front display, connected with at least one end effector for conducting a nondestructive scan of a test object, one or more modular function generator cards, and at least one robotic arm operable to pick up and manipulate the one or more modular function generator cards, wherein the at least one robotic arm is operable to disconnect a first function generator card from the tablet and pick up and install a second function generator card, wherein the tablet receives one or more commands from a user device via network communication, wherein the one or more commands include instructions for the nondestructive scan of the test object, and wherein the at least one robotic arm is operable to replace the one or more function generator cards connected to the tablet based on requirements for the nondestructive scan based on the one or more commands, and wherein the one or more modular function generator cards include one or more pulser receiver elements and/or one or more eddy current signal generators.

These and other aspects of the present invention will become apparent to those skilled in the art after a reading of the following description of the preferred embodiment when considered with the drawings, as they support the claimed invention.

DETAILED DESCRIPTION

Figure 1:
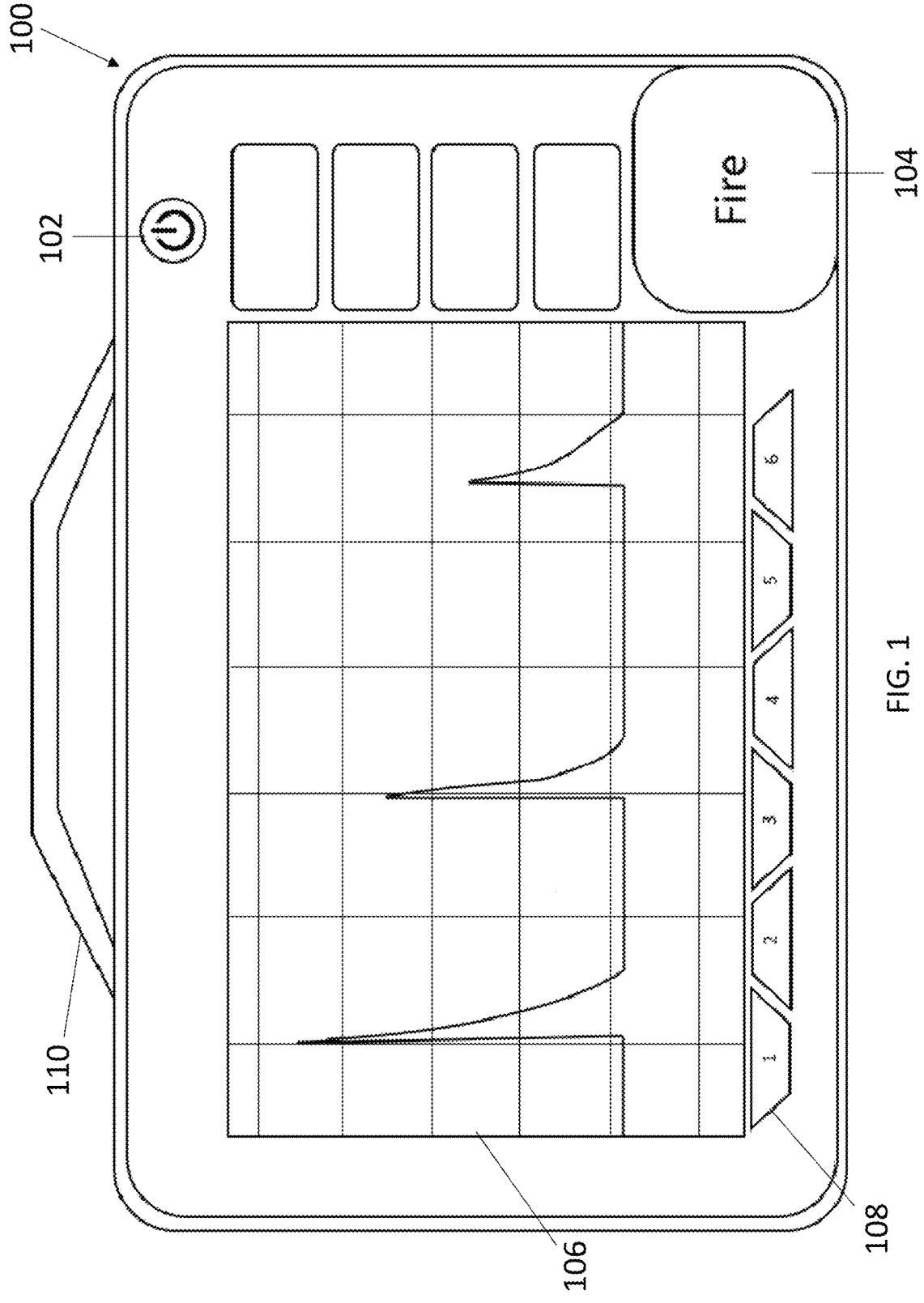
FIG. 1 illustrates a front orthogonal view of a tablet for nondestructive testing according to one embodiment of the present invention.

The present invention is generally directed to system and methods for nondestructive testing, and more specifically to scanning devices with interchangeable inspection cards.

In one embodiment, the present invention is directed to a system for non-destructive testing of materials, including a tablet including a front display, connected with at least one end effector for conducting a nondestructive scan of a test object, one or more modular function generator cards, wherein the tablet includes a first plurality of prongs extending from and/or a first plurality of recesses defined in a rear face of the tablet, wherein the one or more modular function generator cards include a second plurality of prongs extending from and/or a second plurality of recesses defined in front faces of the one or more modular function generator cards, wherein the first plurality of prongs are configured to matingly engage with the second plurality of recesses and wherein the second plurality of prongs are configured to matingly engage with the first plurality of recesses, and wherein the one or more modular function generator cards include one or more pulser receiver elements and/or one or more eddy current signal generators.

In another embodiment, the present invention is directed to a method for non-destructive testing of materials, including a tablet, including a front display, receiving one or more commands to conduct a scan on a test object via network communication with at least one user device, wherein the one or more commands include requirements to use a plurality of different end effectors connected to the tablet, and/or a plurality of modalities for a single end effector connected to the tablet, at least one end effector connected to the tablet beginning a scan of the test object in accordance with the one or more commands, a first function generator card connected with the tablet driving the at least one end effector to conduct the scan, removing the first function generator card from the tablet and connecting a second function generator card to the tablet, wherein the second function generator card connects to the tablet via a first plurality of prongs and recesses on the tablet matingly connecting to a second plurality of prongs and recesses on the second function generator card, and the at least one end effector continuing the scan of the test object, driven by the second function generator card, wherein the first function generator card and/or the second function generator card include one or more pulser receivers and/or one or more eddy current signal generators.

In yet another embodiment, the present invention is directed to a system for non-destructive testing of materials, including a tablet including a front display, connected with at least one end effector for conducting a nondestructive scan of a test object, one or more modular function generator cards, and at least one robotic arm operable to pick up and manipulate the one or more modular function generator cards, wherein the at least one robotic arm is operable to disconnect a first function generator card from the tablet and pick up and install a second function generator card, wherein the tablet receives one or more commands from a user device via network communication, wherein the one or more commands include instructions for the nondestructive scan of the test object, and wherein the at least one robotic arm is operable to replace the one or more function generator cards connected to the tablet based on requirements for the nondestructive scan based on the one or more commands, and wherein the one or more modular function generator cards include one or more pulser receiver elements and/or one or more eddy current signal generators.

Non-destructive testing (NDT) uses a variety of techniques in order to inspect parts for defects, inclusions, and/or irregularities without damaging the parts. Examples of defects, inclusions, or irregularities include foreign objects within the part, delamination between layers of the part, breakage in fibers within a part, cracks in the part, low bond line thickness, and wrinkles, both in-plane and out of plane, in the layers of the part, among others. Additionally, detectable features include anisotropies in metals created during the manufacturing of the metal, such as during rolling, non-uniform cooling, drawing, grain alignment, or other processes for forming the metal. Techniques for finding such defects include eddy currents, ultrasonic testing, acoustic testing, thermographic analysis, visual analysis (often using fluorescent dyes or magnetic particles), and radiographic analysis. Detection of features with NDT is important, as features detected through NDT are capable of indicating parts that need to be repaired or replaced and that otherwise risk premature, and potentially catastrophic failure.

Different NDT inspection types (e.g., eddy current vs. ultrasonic, etc.) require different function generators (and other components of an inspection card) in order to operate. For example, ultrasonic NDT typically uses a pulser-receiver. Pulser-receivers generate brief, but high amplitude electric pulses to innervate an ultrasonic transducer (typically a piezoelectric component), causing the electric energy to be converted to mechanical vibrations that cause the generation of ultrasonic waves. The pulser-receiver is capable of controlling properties such as pulse length, damping, and total voltage applied to the transducer (which affects the energy of the ultrasonic waves). The pulser-receiver also controls how the signal is received once it has traversed a portion of a structure under inspection, often rectifying and filtering the signals to smooth and regularize them, and providing signal amplification. Specific pulser-receivers have different properties, including whether they utilize square waves or individual spikes, arbitrary waveform generation capabilities, what filters they are able to provide (e.g., specific high pass filter frequencies, specific low pass filter frequencies, etc.), specific properties of the generated wave (e.g., maximum and minimum pulse amplitudes, maximum and minimum pulse widths, maximum square wave falling time, maximum square wave rising time, etc.), gain, and other properties. Individual pulser-receivers are therefore often beneficial for different types of ultrasonic scans. It is thus beneficial to be able to switch pulser receivers between scans requiring different parameters that can result in characterizing different features of the same or different structures under inspection.

Eddy Current Testing, on the other hand, utilizes an analogous device to the pulser receiver, typically called a signal generator. The signal generator generates an oscillating waveform between specific high and low frequencies, or drives pulsed currents to the coils of the eddy current probe, so as to generate the magnetic field necessary for operation of the probe. Similarly to ultrasonic testing, different signal generators are capable of generating current with different frequencies or applying different frequency currents, meaning different signal generators are sometimes needed for different eddy current scans.

Currently, the standard way of dealing with inspections that require different function generators is to use entirely separate flaw detectors systems (i.e., including display, battery, user input, and function generator components) for each type of inspection that needs to be performed. This means that, if a particular type of inspection needs to be used and a user's current system is inadequate, an entirely new system needs to be purchased. An example of this is Olympus, which sells the OmniScan MX ECA/ECT system (among others) for eddy current scans and the OmniScan X3 Series of flaw detectors for ultrasonic scans. Both systems have their own displays, user input, power systems, and the different function generators that really differentiate each device. However, performing both ultrasonic and eddy current scans requires both systems in their entireties. This is especially onerous as technology advances and new function generators are needed to perform more up-to-date inspection techniques, requiring a new purchase each time.

The prior art does not provide a system including easily detachable and interchangeable function generators into a larger flaw detection system to reduce cost, reduce spatial requirements for multiple different inspection systems, and improving interoperability. Systems, such as those described in U.S. Pat. No. 10,920,574, do describe a single function generator attached to multiple end effectors, with the ability to switch which end effector is operating at any given time, but this is not equivalent to switching the function generator itself, but rather only changes the end effector. Other systems, such as that described in U.S. Pat. No. 8,202,219 describe "switching networks" that sequentially connects elements of a transducer array to a function generator, but these systems too only utilize a single function generator. Some systems, like that described in U.S. Pat. No. 6,161, 435, do include multiple function generators, but the '435 system has both permanently built into the system, with no description of interchangeability, and with each function generator effectively operating a different transducer.

Referring now to the drawings in general, the illustrations are for the purpose of describing one or more preferred embodiments of the invention and are not intended to limit the invention thereto.

The present system is directed toward a non-destructive testing system able to receive different modular inspection cards for performing tests with one or more types of end effector. In one embodiment, the modular inspection cards include one or more pulser-receiver elements for generating an ultrasonic scanning signal. In one embodiment, the modular inspection cards include one or more eddy current signal generators. In one embodiment, the modular inspection cards include one or more function generators for non-eddy current, non-ultrasonic non-destructive testing (e.g., infrared, radiographic, gigahertz, microwave, etc.).

For the purposes of this application, the term "inspection card" is intended to encompass a device having components and capabilities necessary for carrying out an inspection. Components of inspection card include, but are not limited to, a function generator, a signal generator (e.g., a pulser receiver for ultrasonic inspection cards) including an arbitrary waveform generator, a tone burst generator, and/or a spike pulse generator, high pass, low pass, and/or band pass filters, at least one oscilloscope for interpreting received signal data, one or more analog-digital converters, at least one microprocessor, at least one microcontroller, at least one field programmable gate array (FPGA), at least one input-output interface, and/or at least one wireless antenna or wireless module. One of ordinary skill in the art will understand that not all of these components are necessarily present on each inspection card and each inspection card is also capable of including additional components as well.

FIG. 1 illustrates a front orthogonal view of a tablet for nondestructive testing according to one embodiment of the present invention. A tablet 100 for conducting nondestructive testing includes a power button 102 for activating power to the tablet 100. In one embodiment, the tablet 100 includes an initiation button 104 for generating a signal from a function generator attached to the tablet 100 to a transducer and/or other end effector connected to the tablet 100. In one embodiment, the tablet 100 includes one or more settings buttons 108 operable to change a scanning mode and/or a display mode for the tablet 100 (e.g., changing displayed units, scaling the inspection data, increasing or decreasing inspection sampling frequency, etc.). One of ordinary skill in the art will understand that buttons according to the present invention are able to be substituted with other actuation methods, including switches, knobs, and/or other components. Furthermore, one of ordinary skill in the art will understand that the functionality of buttons on the tablet as described herein is not intended to be limiting and is able to include any type of button found on non-destructive testing systems in the art (e.g., number pad, keyboard, etc.). In one embodiment, the tablet 100 includes at least one gripping location 110 for gripping the tablet 100 for operation or transport.

In one embodiment, the tablet 100 is configured for wireless communication with at least one other computer and/or at least one server. In one embodiment, the wireless communication includes communication over at least one wireless local area network (WLAN) (e.g., WI-FI communication). In one embodiment, the wireless communication includes communication over at least one wireless personal area network (WPAN) (e.g., BLUETOOTH). In one embodiment, the wireless communication is configured to transmit inspection data to the at least one other computer and/or at least one server. In one embodiment, the tablet 100 includes at least one universal serial bus (USB) port and/or a port to receive a cord for at least one external hard drive, allowing inspection data to be saved to a USB drive and/or at least one other type of external hard drive.

Figure 2A:
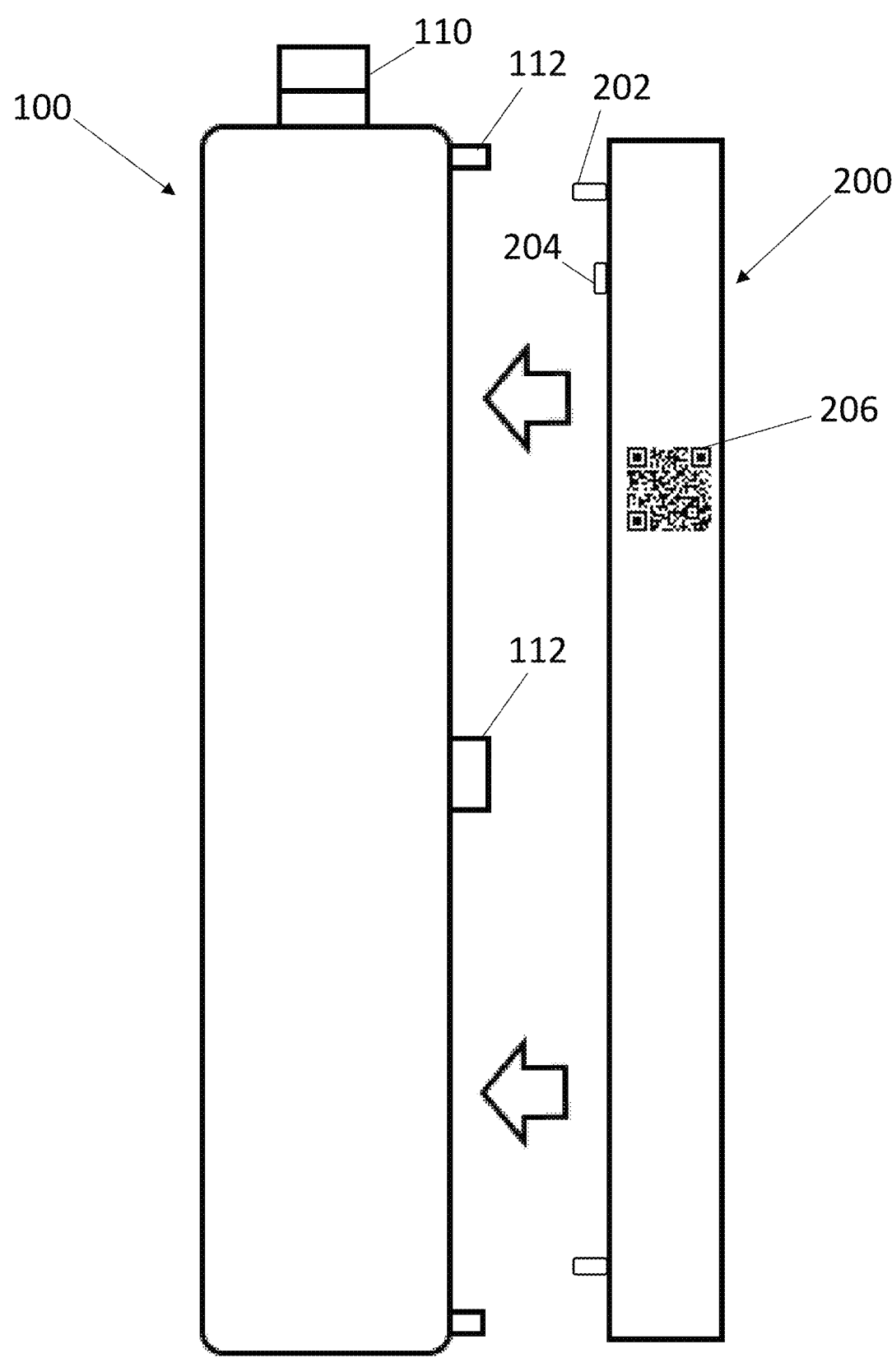
FIG. 2A illustrates a side orthogonal view of a tablet for nondestructive testing and a inspection card attached at the rear according to one embodiment of the present invention.
Figure 2B:
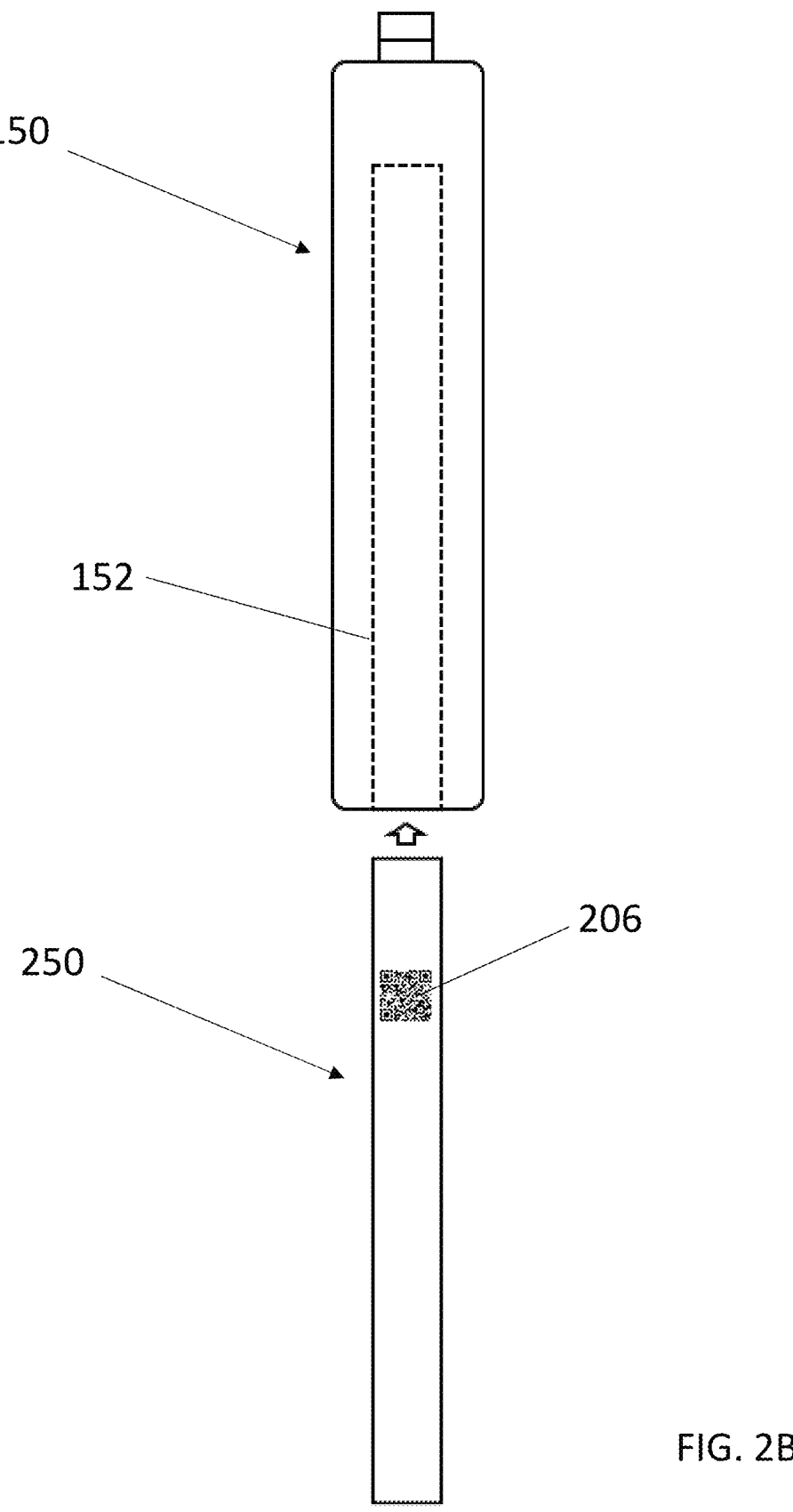
FIG. 2B illustrates a side orthogonal view of a tablet for nondestructive testing with a inspection card inserted according to one embodiment of the present invention.

FIG. 2A illustrates a side orthogonal view of a tablet for nondestructive testing and an inspection card attached at the rear according to one embodiment of the present invention. In one embodiment, at least one inspection card 200 is attachable to a rear side of the tablet 100. In one embodiment, the rear face of the tablet 100 includes one or more clips 112 configured to hold the inspection card 200 to the tablet 100 to ensure that it remains fully attached for the duration of the inspection. In one embodiment, the inspection card 200 includes one or more prongs 202 for inserting into corresponding recesses in the rear of the tablet 100 in order to connect the inspection card 200. In one embodiment, the inspection card 200 includes at least one plug 204, insertable into at least one port in the rear of the tablet 100, for connecting the inspection card 200 electronically with the tablet. In another embodiment, as shown in FIG. 2B, a tablet 150 includes at least one port 152 on a top side, a bottom side, or one or more lateral sides for receiving at least one inspection card 250. The inspection card 250 is sized and shaped matingly to the at least one port 152, such that the inspection card 250 is able to fit snugly into the at least one port 152.

In one embodiment, each inspection card 250 includes one or more self-aligning tabs in order to facilitate the inspection card 250 matingly entered the at least one port 152 of the tablet 150 and/or to facilitate the inspection card 250 entered a slot in a rack capable of holding a plurality of inspection cards 250.

In one embodiment, each inspection card 250 includes at least one unique visual code 206 on an exterior surface of the inspection card 250. In one embodiment, at least one camera and/or at least one other visual inspection system (e.g., LiDAR) automatically scans the inspection card 250 to identify the at least one unique visual code 206 to determine the type of each inspection card 250 (e.g., eddy current card, ultrasonic pulser-receiver card, one specific variant of an ultrasonic pulser-receiver card, etc.) and/or the orientation of each inspection card 250 in order to determine at what angle a robotic arm is able to pick up the inspection card 250 and insert it into the tablet 150. One of ordinary skill in the art will understand that although the at least one unique visual code 206 is depicted on the side of an inspection card 250 in FIGS. 2A and 2B, the at least one unique visual code 206 is able to be on any part of the inspection card 250 (e.g., on at least one handle extending outwardly from the inspection card 250). In a preferred embodiment, the location of the at least one unique visual code 206 relative to the rest of the inspection card 250 is consistent for each inspection card 250 such that the orientation of the inspection card 250 is better able to be determined based on the location of the at least one unique visual code 206. Additionally or alternatively, in one embodiment, each inspection card includes at least one radiofrequency identification (RFID) chip and/or at least one near-field communication (NFC) chip. A robotic arm includes at least one RFID and/or NFC detection mechanism to detect the type of each inspection card 250 and/or the orientation of each inspection card 250 in order to determine at what angle a robotic arm is able to pick up the inspection card 250.

Figure 3:
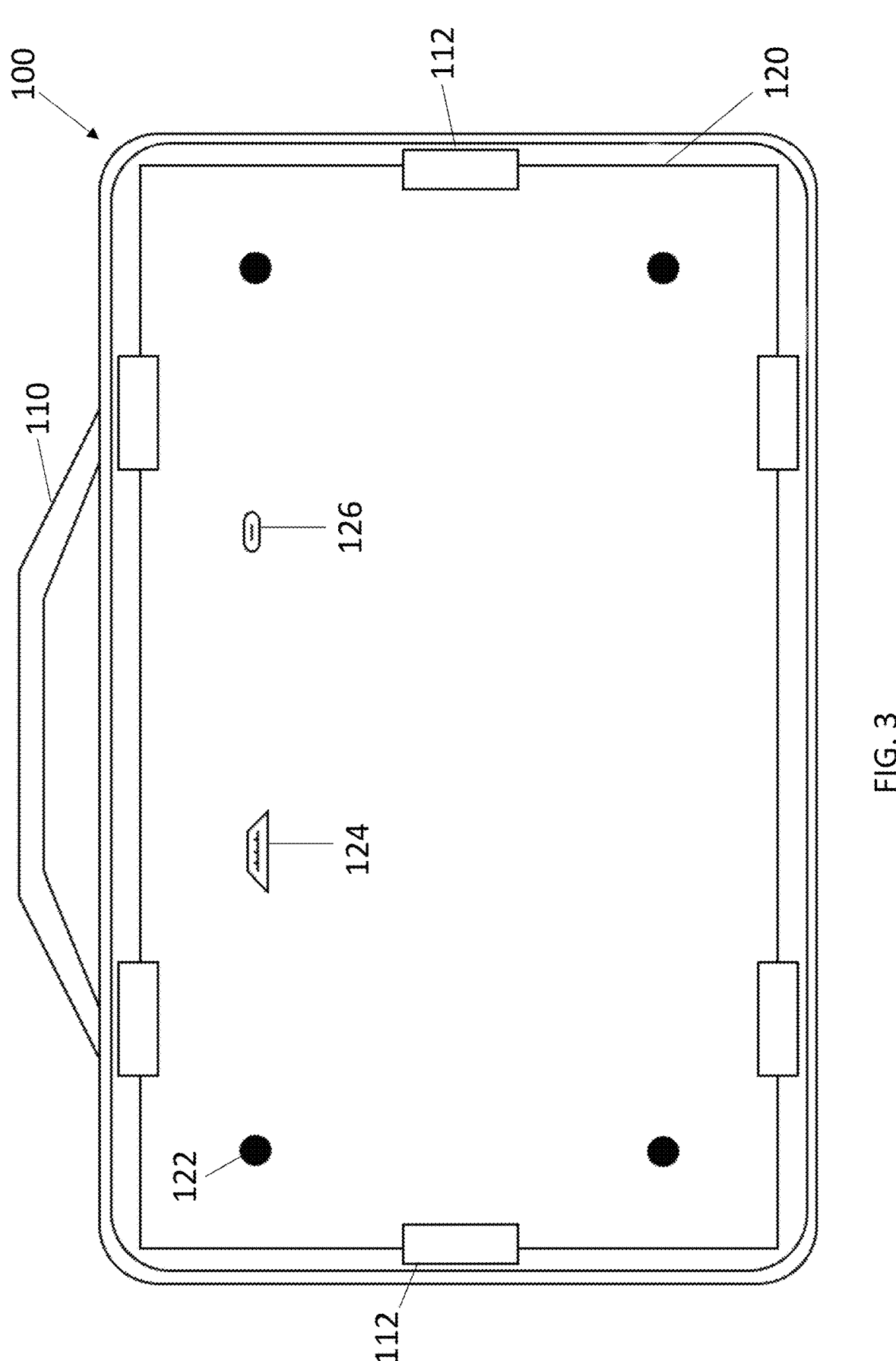
FIG. 3 illustrates a rear orthogonal view of a tablet for nondestructive testing according to one embodiment of the present invention.

FIG. 3 illustrates a rear orthogonal view of a tablet for nondestructive testing according to one embodiment of the present invention. In one embodiment, the rear face of the tablet 100 includes one or more clips informed to snap onto and physically couple the inspection card to the tablet 100. In one embodiment, the rear face of the tablet 100 includes one or more recesses 122 configured to receive one or more prongs on the function generator to physically couple the inspection card to the tablet 100 via frictional engagement of the one or more prongs with the one or more recesses 122. In one embodiment, the rear face of the tablet 100 includes a first port 124, a second port 126, and/or one or more additional ports for connecting to at least one plug 204 of an inspection card to electronically couple the inspection card with the tablet 100.

In one embodiment, a system includes at least one robotic arm operable to pick up one or more inspection cards (e.g., from a rack) and automatically attach or insert the one or more inspection cards to a tablet based on receiving a selection (e.g., from the tablet) of a type of inspection (or inspections) that the user wishes to perform. The at least one robotic arm is configured to specifically retrieve the one or more inspection cards necessary to complete the selected inspection. This allows the switching of the inspection card to be automatic, rather than requiring manual action by a user. In another embodiment, the inspection card used with the tablet is manually replaced. As mentioned above, in one embodiment, the at least one robotic arm includes and/or is in communication with at least one camera and/or at least one visual inspection system capable of identifying at least one unique visual code on the inspection card in order to identify what type of inspection card to pick up and/or what orientation each card is in. Alternatively, in one embodiment, each inspection card is inserted at a specific point on a rack or other carrying structure and, when instructed to retrieve a specific inspection card, the robotic arm automatically picks up the inspection card from the known location on the rack or other carrying structure.

In one embodiment, the at least one camera and/or the at least one visual inspection system is capable of object recognition of components of at least one tablet and/or at least one inspection card other than at least one unique visual code. For example, in one embodiment, at least one visual inspection system is capable of recognizing a pattern of pins or jacks extending outwardly from a surface of at least one inspection card, and thereby able to determine which surface is being observed and the relative orientation of the remainder of the inspection card such that the robotic arm is able to determine at what angle to approach the at least one inspection card to pick it up. In another example, the recognizable components of the at least one tablet and/or the at least one inspection card include one or more colored corners of a surface of the inspection card.

Figure 4:
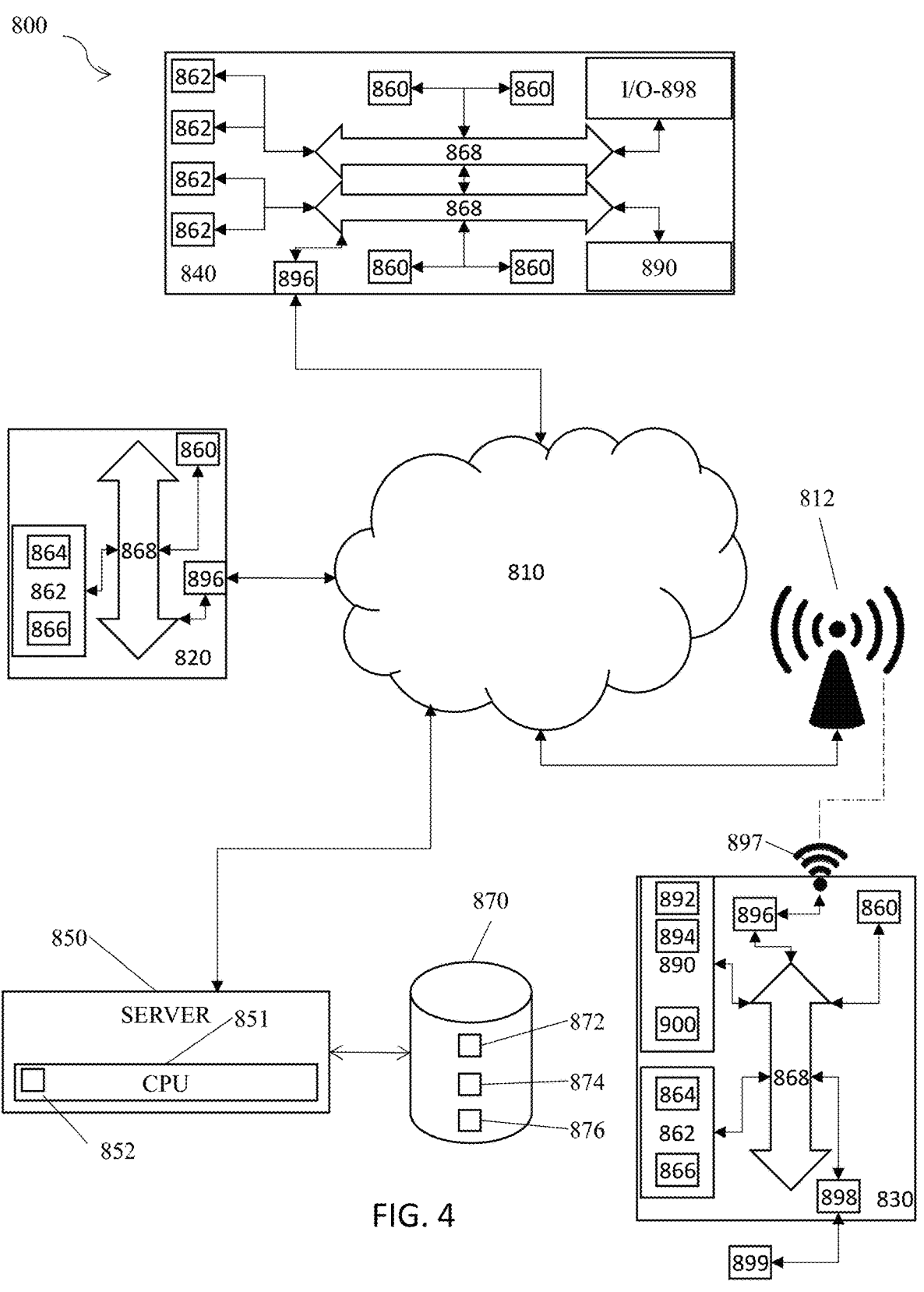
FIG. 4 is a schematic diagram of a system of the present invention.

FIG. 4 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 4, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868.

Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 4, is operable to include other components that are not explicitly shown in FIG. 4, or is operable to utilize an architecture completely different than that shown in FIG. 4. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A method for non-destructive testing of materials, comprising:
   a tablet, including a front display, receiving one or more commands to conduct a scan on a test object via network communication with at least one user device;
   wherein the one or more commands include requirements to use a plurality of different end effectors connected to the tablet, and/or a plurality of modalities for a single end effector connected to the tablet;
   at least one end effector connected to the tablet beginning a scan of the test object in accordance with the one or more commands;
   a first function generator card connected with the tablet driving the at least one end effector to conduct the scan;
   removing the first function generator card from the tablet and connecting a second function generator card to the tablet, wherein the second function generator card connects to the tablet via a first plurality of prongs and recesses on the tablet matingly connecting to a second plurality of prongs and recesses on the second function generator card; and
   the at least one end effector continuing the scan of the test object, driven by the second function generator card;
   wherein the first function generator card and/or the second function generator card include one or more pulser receivers and/or one or more eddy current signal generators.

2. The method of claim 1, wherein the one or more commands do not explicitly state which function generator cards are necessary for each part of the scan, and wherein a processor of the tablet automatically determines which function generator cards are necessary and when each of the function generator cards is necessary.

3. The method of claim 1, wherein the first function generator card and/or the second function generator card includes at least one unique radiofrequency identification (RFID) chip and/or at least one unique near-field communication (NFC) chip.

4. The method of claim 1, wherein the first function generator card and/or the second function generator card includes at least one unique visual code attached to or etched into one or more sides of the first function generator card and/or the second function generator card.

5. The method of claim 1, wherein the network connection is a wireless local area network (WLAN) or a wireless personal area network (WPAN).

* * * * *